Jan. 19, 1943.  L. S. BURGETT  2,308,673
ELECTRIC CABLE
Original Filed March 14, 1940  3 Sheets—Sheet 1
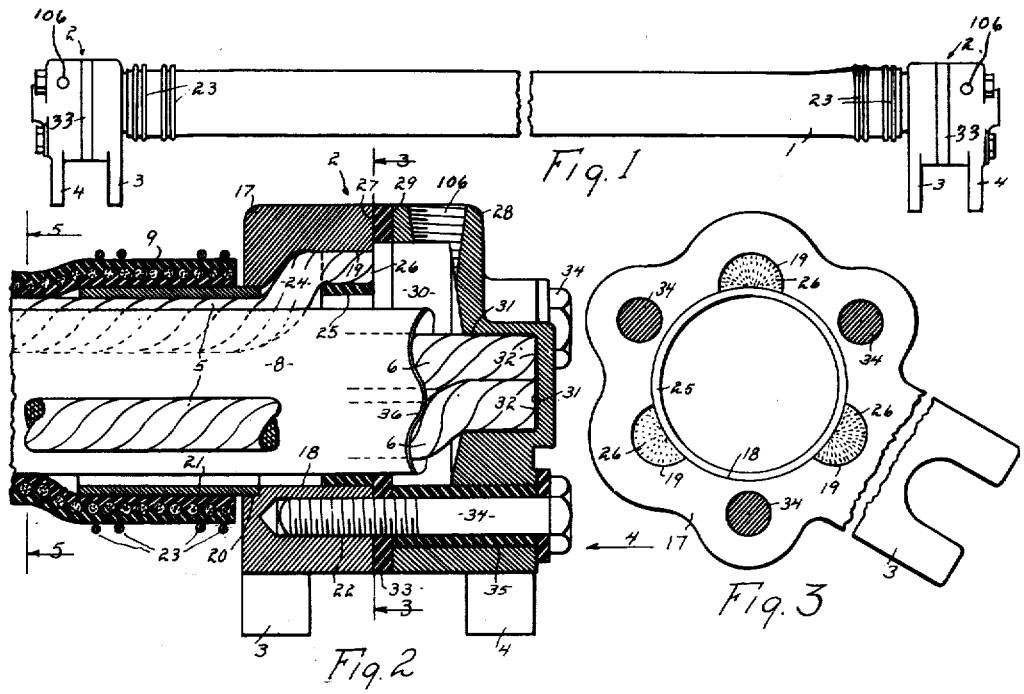
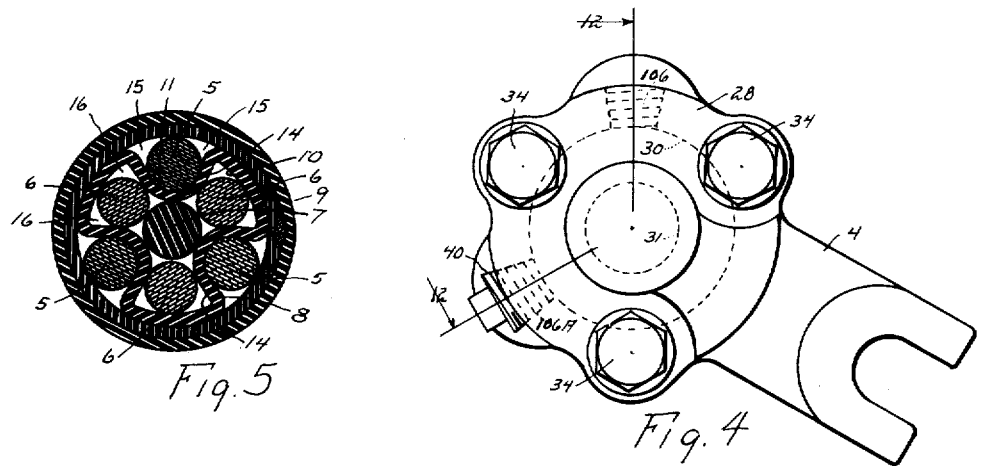
INVENTOR.
Lynn S. Burgett
Harry P. Canfield
Attorney
BY Jan. 19, 1943. L. S. BURGETT 2,308,673
ELECTRIC CABLE
Original Filed March 14, 1940 3 Sheets-Sheet 2
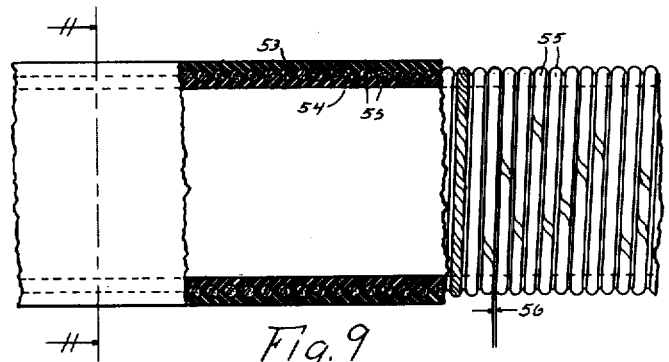
Fig. 9
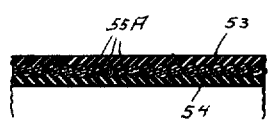
Fig. 10
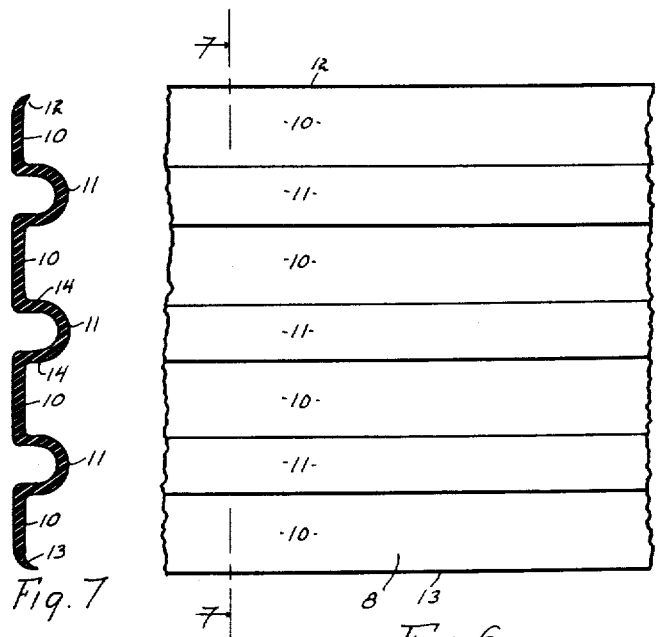
Fig. 7
Fig. 6
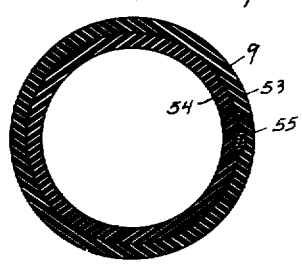
Fig. 11
INVENTOR.
Lynn S. Burgett
BY Harry P. Canfield
Attorney Jan. 19, 1943.  L. S. BURGETT  2,308,673
ELECTRIC CABLE
Original Filed March 14, 1940  3 Sheets-Sheet 3
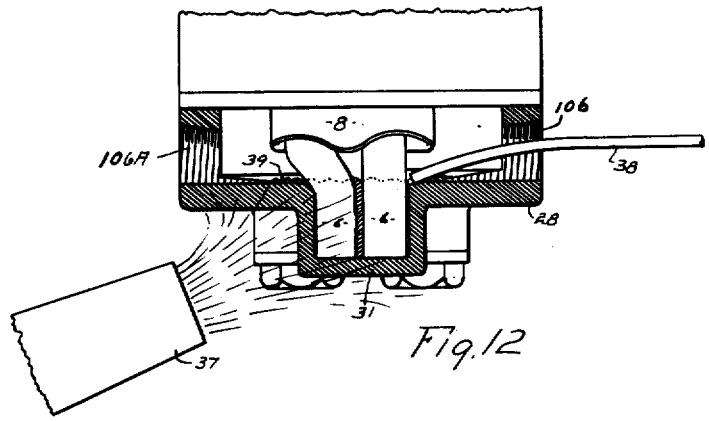
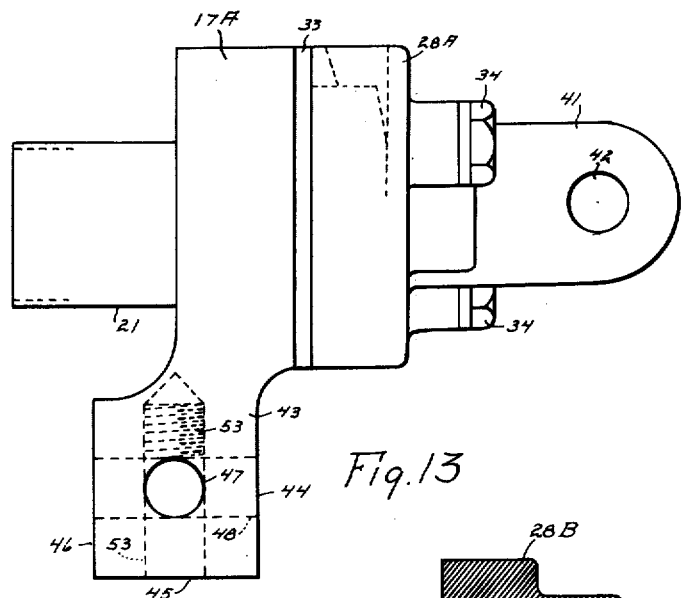
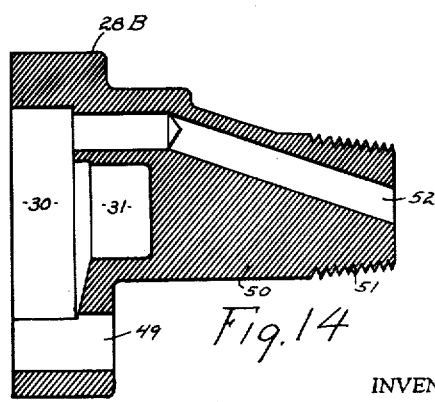
INVENTOR.
Lynn S. Burgett
BY Harry P. Canfield
Attorney Patented Jan. 19, 1943

2,308,673

UNITED STATES PATENT OFFICE 2,308,673

ELECTRIC CABLE

Lynn S. Burgett, Euclid, Ohio, assignor to The Clark Controller Company, Cleveland, Ohio, a corporation of Ohio Original application March 14, 1940, Serial No. 323,971. Divided and this application September 12, 1940, Serial No. 356,463

4 Claims. (Cl. 174—15)

This invention relates to electric cables and terminals therefor, and particularly to cables for carrying currents of great amperage, and constructed to be flexible.

Cables of the class referred to are used for various purposes wherein the current to be conducted by the cable is of great amperage and wherein the cable must bend in use, one illustrative use being to conduct welding current to a moving welding gun or machine, in which case any lack of flexibility in the cable would interfere with the free movement of the gun by the operator thereof.

The invention comprises various improvements over prior cables of this class, which appear in the following objects of the invention.

It is among the objects of the invention:

To provide generally an electric cable of relatively great amperage capacity having an improved quality of flexibility;

To provide generally an electric cable having improved means for conducting cooling fluid, such as liquid, therethrough;

To provide in a cable of the multi-conductor class an improved construction of terminal for the ends of the conductors by which electric connections made be made to the conductors of the cable; and/or by which cooling fluid may be introduced into and circulated through the cable; and/or admitting of the practice of an improved method for securing the ends of the cable conductors to the terminals;

To provide generally an improved means for securing the ends of the conductors of a multi-conductor cable to end terminals thereof;

To provide an improved means for an electric cable adapted to be constructed in various forms to adapt it to be attached to different types of apparatus;

To provide for multi-conductor cables of the liquid cooled type, improved means for insulating the conductors one from the other and for providing cooling liquid passageways through the cable;

To provide an improved construction of insulator for the conductors of a multi-conductor electric cable;

Other objects will be apparent to those skilled in the art to which my invention appertains.

My invention is fully disclosed in the following description taken in connection with the accompanying drawings, in which:

Fig. 1 is a side elevational view of an electric cable embodying my invention, and illustrating one construction of terminal connector at the ends thereof;

Fig. 2 is a longitudinal sectional view of the right hand end of the cable of Fig. 1 and drawn to enlarged scale;

Fig. 3 is a sectional view taken from the plane 3—3 of Fig. 2 and with some of the parts thereof omitted for simplicity;

Fig. 4 is a view taken in the direction of the arrow 4 of Fig. 2;

Fig. 5 is a cross-sectional view taken from the plane 5—5 of Fig. 2;

Figs. 6 and 7 are respectively plan and cross-sectional views of an insulator which I may employ in the cable of Fig. 2, Fig. 7 being taken from the plane 7—7 of Fig. 6, and these views illustrating the sheet form in which the insulator is first made, the aforesaid Fig. 5 illustrating the insulator in its assembled condition in the cable;

Fig. 8 is a view in some respects diagrammatic for clearness, illustrating the overlapping of opposite edges of the insulator of Fig. 7 when it is assembled in the cable as in Fig. 5;

Fig. 9 is a view, a part of which is in elevation, a part of which is in longitudinal section, and a part of which has an outer portion broken away, illustrating the construction of an outer casing or hose of the cable of Fig. 2;

Fig. 10 is a view similar to a part of Fig. 9 illustrating a modification;

Fig. 11 is a cross-sectional view taken from the plane 11—11 of Fig. 9;

Fig. 12 is a view similar to a part of Fig. 2 and illustrating certain steps of method which I may employ in securing conductors of the cable to a terminal head thereof, the view being taken approximately on the plane 12—12 of Fig. 4;

Fig. 13 is a view in elevation illustrating a modified form of a terminal connector;

Fig. 14 is a view illustrating in longitudinal section another modification of one of the terminal connectors of Fig. 2 or of Fig. 13.

Referring to Fig. 1 of the drawings, I have shown at 1 the cable proper, and at 2—2 end terminals therefor. The terminals 2—2 may be alike or different, as will appear hereinafter, but as shown in the drawings, the terminals are alike and are generally of hollow walled form (see Fig. 2) and each comprises terminal heads 17 and 28 insulated from each other by an insulator 33; and threaded openings 106—106 are provided in the opposite terminals 2 whereby coolant or cooling fluid may be conducted into the cable at one end and out at the other. The terminal heads 17—17 are connected to one set or group of conductors in the cable, and the terminal heads 28—28 are connected to another set or group of conductors, and connectors 3 and 4 are provided on the terminal heads 17 and 28 respectively, and as will be explained hereinafter, the connectors 3 and 4 may be constructed in various types to adapt them to be connected to various types of apparatus, such for example as a transformer at one end of the cable and a welding gun at the other end, when the cable is to be used to carry welding current.

The right hand terminal 2 and the corresponding end of the cable are shown in longitudinal section in Fig. 2, and coordinate therewith, the terminal heads 17 and 28 being shown in Figs. 3 and 4 in elevation.

The main body of the cable as shown in Figs. 2 and 5, comprises a plurality of conductors in groups alternately arranged, as for example at 5—5—5 and 6—6—6 in Fig. 5; and disposed around a longitudinal core of rubber or the like 7; and insulated from each other by a convoluted insulator 8 of rubber or like flexible insulating material, and surrounded by a tubular casing or hose 9.

The conductors 5 and 6 are preferably made up in a well known manner, of thread wires and strands woven or twisted into rope form to render them flexible.

To simplify the drawing, particularly Fig. 2, the conductors 5 and 6 are illustrated as lying parallel to the axis of the cable, and in fact, may be disposed in this relationship, but I prefer to dispose the conductors in helical arrangement around the longitudinal axis.

In assembling the conductors 5 and 6, and the insulator 8, the conductors 6—6 may first be laid around the core 7, and the insulator 8 laid thereon; and the conductors 5—5 then laid in convolutions in the insulator, to be presently described, and then the casing or hose 9 is telescoped longitudinally over the insulator and conductors, the hose or casing being shorter than the insulator and conductors, so that the latter project out of the opposite ends thereof.

The insulator 8 is shown in Figs. 6 and 7 in the form in which it is first made. Preferably it is made from rubber by an extrusion or other process into generally planar or sheet form, comprising flat or planar portions 10—10, and spaced loop portions or convolutions 11—11 between the planar portions, and in the present illustrative instance, where there are to be three conductors 5—5—5, there will be three such convolutions. The outermost planar portion 10 at each side of the insulator, terminates in bent thinned edges 12 and 13. The sheet 8 may be made of considerable length, and at the time of making a cable of any chosen length, a piece from such long strip is cut off to approximately the necessary length, to be referred to, and is then folded around the core 7 to cause it to take up the cross-sectional shape shown in Fig. 5, wherein the loop portions 11 are disposed so that the conductors 5—5 may be laid therein and wherein the planar portions 10—10 bend so that they define a longitudinal cylinder firmly or tightly engaged with the inner wall of the hose 9 when telescoped thereover, as plainly shown in Fig. 5. The edges 12 and 13 of the strip, when bent into the form of Fig. 5, are disposed approximately as shown in Fig. 8.

Bending the sheet insulator from the form of Fig. 7 to the condition in Fig. 5, causes the convolutions 11, as shown for one of them in Fig. 5, to become divergent, and causes the side walls 14, Figs. 5 and 7, of each convolution to be disposed generally radially, as shown in Fig. 5.

It follows that when the core 7, insulator 8, conductors 5—5 and 6—6 and the outer sleeve or cover 9 are assembled as shown in Fig. 5, or Fig. 2, there are longitudinal passageways 15—15 along the sides of the conductors 5—5 and longitudinal passageways 16—16 along the sides of the conductors 6—6, the passageways 15—15 being separated by the insulator 8 from the passageways 16—16, and the conductors 5 being insulated from the conductors 6.

If the conductors 5—5 and 6—6 are to be disposed in helical arrangement around the core, the sheet 8 is folded around the core 7 so that its edge portions overlap on a helical zone thereby disposing the convolutions 11 in helical arrangement.

The assembled cable proper, made as above described, is now joined to the hollow walled terminals 2—2 as follows, and as shown for one of them in Fig. 2.

The connector 3 is joined to a terminal head 17, preferably by being made integral therewith as a casting of copper or other highly electrically conducting material, and a material to which solder or other fusible metal will adhere, for a purpose to be described. The terminal head 17 comprises a central cylindrical opening 18, the periphery of which is outwardly radially recessed by a plurality, such as three, circular recesses 19—19, and inwardly toward the cable proper and beyond the recesses, the terminal head 17 has an annular shoulder 20, into which is fitted and secured, for example by soldering, a short tubular sleeve 21, slightly larger in outside diameter than the inside diameter of the outer hose or casing, and larger on its inside diameter than the diameter of the assembled conductors and insulator. The terminal head 17 is also provided with a plurality of threaded holes 22.

For the next step of the assembling operation, the conductors 5 and 6 and the insulator 8 are telescoped or projected through the sleeve 21 and opening 18 of the terminal head 17, and the hose 9 is concurrently telescoped over the sleeve 21, which stretches it tight thereon, to seal it liquid tight therewith, and it is further sealed and secured thereon against displacement by a wrapping of wire shown at 23, Figs. 1 and 2. The outer conductors 5—5 are now bent outwardly radially, as shown at 24, Fig. 2, and laid in the recesses 19, and an assembling sleeve 25 is telescoped into the opening 18 substantially fitting the same and forcing the ends of the conductors into the recesses 19, the wall of the recesses and adjacent parts of the sleeve 25 constituting pockets into which the ends of the conductors are firmly lodged. The three conductors 5 are disposed in this manner and their end portions which extend beyond the terminal head 17 are then cut off as at 26 preferably flush with a transverse plane 27 on the terminal head 17. Solder or other fusible metal is then applied by well known heating means to the ends of the conductors 5, at 26 in the recesses 19, to securely join the wires thereof together, and to integrally unite them with the terminal head 17 at the walls of the recesses 19.

The other terminal head 28, Figs. 2 and 4, has a transverse planar face 29, and a generally cup form interior 30, and an inwardly open pocket

31. The ends of the conductors 6 are now cut off as at 32, Fig. 2, to a measured length beyond the plane 27 referred to, and the face 29 of the terminal head 28 is placed upon the face 27 of the terminal head 17 with an insulating washer 33 therebetween, and bolts 34—34 are projected through insulating sleeves 35 in the head 28 and through perforations in the insulator 33 and threaded into the threaded holes 22 to rigidly seal and clamp the terminal head 28 upon the terminal head 17 with the ends of the conductors 6 in the pocket 31.

The terminal head 28 has a plurality, such as two, pipe threaded openings 106 and 106A, extending therethrough and communicating with the cup form interior 30.

The threaded openings 106 and 106A may be variously disposed. As shown in Fig. 4, in the form illustrated, they are disposed at an angle of approximately 120 degrees with each other but may, as will be understood, be disposed diametrically opposite, or otherwise.

Before the terminal head 28 is bolted on, as described, the insulator 8 is cut off at a point within the cup form interior 30, for example, as shown at 36, short of the pocket 31.

For the next step of the assembling operation, the cable, illustrated thus far in horizontal position, is supported vertically, as indicated in Fig. 12, which disposes the pocket 31 at the lowermost point of the terminal head 28. By means of a blow torch or other heat supplying means 37, the terminal head 28, and particularly the pocket 31 thereof, are heated, thus heating the end portions of the conductors 6—6; and a wire or stick 38 of solder or other fusible metal is projected through one of the said pipe threaded openings, for example the opening 106, and into engagement with the hot head 28 and conductors 6, and the solder melts and flows around the conductors filling the pocket 31 and up to a level such as that shown at 39 joining the conductors to each other and to the wall of the pocket. This operation may be viewed through the other opening 106A, and the filling with solder may therefore be stopped at a suitable observed level 39.

Upon removing the source of heat, and the soldering stick 38, the solder sets and integrally joins the conductors 6 to the terminal head 28.

The opposite end of the cable is assembled in the same way as that just described. The electric circuit through the cable will be seen to be from one of the connectors, say the connector 4, from a current source, through the inner conductors 6, out at the other connector 4, to apparatus to be energized and back therefrom through the connector 3, and through the outer conductors 5, to the other connector 3, and to the source, as an illustrative use.

Cooling liquid may be circulated through the cable. By one method, one of the openings, say 106A, is closed by a plug 40, Fig. 4, and a cooling liquid conduit has a threaded terminal thereof threaded into the other opening 106. Cooling liquid therefore will enter the cup form interior 30 and there divide, part flowing around the conductors 6—6 and longitudinally through the passages 16—16, and out through a corresponding chamber and conduit at the other end of the cable; and part flowing from the cup form interior 30 through the opening 18, and longitudinally through the passageways 15—15 and out at the other end of the cable; thus flowing in two streams, each stream in direct contact with the metal of the conductors of one of the groups of conductors, and each stream insulated from the other by the insulator 8 through the major part of the cable.

The assembling sleeve 25 may be left in the position of use, and as illustrated in Fig. 2, or after the conductors 5 have been soldered into the recesses 19, it may be removed.

The connectors 3 and 4 are in the form of lugs with open ended slots to receive bolts for clamping them on to an apparatus part.

In Fig. 13 is illustrated a modification, in which the terminal heads 17A and 28A and the insulating washer 33 and bolts 34 and sleeve 21 are similar to those in the form of Fig. 2, but the connectors thereof are different. The connector connected to the terminal head 28A is in the form of a longitudinally extending tongue 41; having a perforation 42 therein by which it may be bolted to a point of use. The connector 43 connected to the terminal head 17A is provided with faces 44, 45, 46 and bolt holes 47 and 48 and a threaded bolt hole 53; laminated flexible conductors may be bolted to this connector by bolts projecting through the bolt hole 48 or into the threaded bolt hole 53 and the laminated conductors lying against one of the faces 44 to 46 in a well known manner or the connector 43 may be bolted to a point of use by a bolt through the hole 47.

In Fig. 14, is illustrated a modification of the outer terminal head 28B corresponding to the terminal head 28. This terminal head has the cup form interior 30 and pocket 31 and holes 49 for the bolts, as in the form of Fig. 2. The electrical connector 50 projects axially from the terminal head and has threads 51 on the end thereof by which it may be screwed into an apparatus part, such as a welding gun, at the point of use, and has a cooling fluid duct 52 opening outwardly and therefore communicating with a corresponding duct in the part or gun to which the connector is threadedly joined, and the duct 52 communicates with the cup form interior 30. With this form, as will be apparent, the cooling liquid which flows through the cable, may also flow through the part or gun to which the connector 50 is connected.

Referring now to Figs. 9, 10 and 11, which illustrate more particularly the construction of the outer hose or casing shown at 9, in Figs. 2 and 5, the hose is seen to comprise an outer layer or tube 53, and an inner tube of rubber 54, with a layer of cord 55 therebetween. In prior hoses, threads or small cords of woven arrangement have been disposed between inner and outer layers of rubber. In some cases, because of the woven character of the threads, the threads extend longitudinally of the hose or in helical direction therethrough, some following a right hand helix and others a left hand helix. In either case, and in all prior hoses of which I have knowledge, when the hose bends, at least some of the cords or threads of the fabric are put under tension, which resists the bending of the hose and renders it stiff and of little flexibility, and causes the bent hose to buckle and assume an elliptical cross-sectional form.

In the hose of the present invention, the thread or cord 55 is solely helical, having no parts that are put under tension when the hose bends, and the base therefore has substantially the same flexibility as if it were made wholly of rubber and without the reinforcing thread or cord, and may be bent upon a relatively short radius without deforming its circular cross section; and when used as the covering hose or casing of a cable such as that described above, increases enormously the flexibility of the cable, over prior cables. For example, as an experiment I have found that a six-conductor cable, constructed and assembled complete as described hereinbefore and as illustrated and of such a size that the outside diameter of the assembled hose is 1¾ inches, can be wrapped freely spirally around a 6 inch diameter pipe without materially distorting the cross-sectional circular form. The helical cord 55 at the same time prevents distortion of the casing by cooling fluid under pressure. Furthermore, the cable is rendered "flexible" in the torsional direction by the hose of this construction. A cable such as that illustrated and of 1¾ inches outside diameter and say 8 feet long can be twisted merely by the force of the human hands to approximately 450 degrees from normal in the direction that winds up the helix of the conductors for the usual helical angle thereof and 720 degrees from normal in the other direction.

In Fig. 9, I have illustrated the cord 55 as being a single cord, such as a cord of cotton, but it will be understood that the cord may be made of multiple parallel strands, or threads.

In making the hose of Fig. 9, a suitable process is to extrude the inner tube 54 and mount it on a mandril and then wind the cord 55 helically thereon, at such a pitch that there is a space 56 between adjacent convolutions. The space may be commensurable with the diameter of the cord. Then an extruded outer tube 53 is telescoped over the cords. Then the two tubes are vulcanized together, being thereby integrally united through the cord convolutions and on the portions 56 between adjacent convolutions.

In the modification Fig. 10, the cord 55A is wound at such a pitch that adjacent convolutions of the cord touch or substantially touch each other and the outer and inner tubes 50 and 54 are vulcanized together primarily through the fibers of the cord.

A hose or casing made in this manner with its reinforcing thread or cord wound helically only while affording great flexibility transversely which is highly desirable as referred to, is elastic and of relatively little strength to resist stretching longitudinally, and this would render it inferior for some uses; but in the cable described above, such hose or casing is prevented from longitudinal stretching by being secured at its opposite ends as shown and described to the end terminals which in turn are secured to the longitudinally inelastic metal conductors 5 and 6 within the casing.

My invention is not limited to the exact details of construction illustrated and described. Changes and modifications may be made within the spirit of my invention without sacrificing its advantages, and within the scope of the appended claims.

This application was filed as divisional from my application Serial Number 323,971, filed March 14, 1940; and subject matter illustrated and described herein but not claimed is being claimed in my applications Serial Number 356,462, filed September 12, 1940, and Serial Number 359,107, filed September 30, 1940.

I claim:

1. In a flexible, heavy current cable, a plurality of flexible conductors extending longitudinally of the body of the cable and surrounded by a tubular casing, and disposed in two insulated groups in the body and at the end of the cable, the groups at the end of the cable being connected respectively to two terminal heads of a generally hollow-walled terminal, one head being generally annular and connected to the casing, the other head being generally of cup form and secured at the end of the cup skirt to the annular head and insulated therefrom on transverse surfaces of the said skirt and said annular head respectively, a plurality of coolant passages extending through the body of the cable for conducting coolant over the two groups of conductors, and the passages all communicating with the cup interior of the cup form head, and an opening through the wall of the cup form head for supplying coolant to all of the passages.

2. In a flexible, heavy current cable, a plurality of flexible conductors extending longitudinally of the body of the cable and surrounded by a tubular casing, and disposed in two insulated groups in the body and at the end of the cable, the groups at the end of the cable being connected respectively to two terminal heads of a generally hollow-walled terminal, one head being generally annular and connected to the casing, the other head being generally of cup form and secured at the end of the cup skirt to the annular head and insulated therefrom on transverse surfaces of the said skirt and said annular head respectively, a plurality of coolant passages extending through the body of the cable for conducting coolant over the two groups of conductors, and the passages all communicating with the hollow walled terminal interior, and means to conduct coolant from a supply source through the terminal wall to the passages.

3. In a flexible, heavy current cable, a plurality of flexible conductors extending longitudinally of the body of the cable and surrounded by a tubular casing, and the conductors being substantially inelastic longitudinally and disposed in two insulated groups in the body and at the ends of the cable, the groups at the opposite ends of the cable being connected to corresponding terminals each comprising two terminal heads, one head being generally annular and connected to the casing, the other head being generally of cup form and secured at the end of the cup skirt to the annular head and insulated therefrom on transverse surfaces of the said skirt and said annular head respectively, a plurality of coolant passages extending through the body of the cable for conducting coolant over the two groups of conductors, and the passages all communicating at the opposite ends of the cable with the cup interiors of the corresponding cup form heads respectively, and an opening through the wall of one cup form head for supplying coolant to all of the passages, and an opening through the wall of the other cup form head for discharging the coolant, the tubular casing being composed of flexible elastic material and having a cord incorporated in the material of the casing wall and disposed helically only about the casing axis to strengthen the casing wall radially without materially reducing its flexibility, the connection of the longitudinally inelastic conductors to the terminals preventing longitudinal stretching of the casing.

4. In a flexible, heavy current cable, a plurality of flexible conductors extending longitudinally of the body of the cable and surrounded by a tubular casing, and the conductors being substantially inelastic longitudinally and disposed in two insulated groups in the body and at the ends of the cable, the groups at the opposite ends of the cable being connected to corresponding hollow walled terminals each comprising two terminal heads, one head being generally annular and connected to the casing, the other head being generally of cup form and secured at the end of the cup skirt to the annular head and insulated therefrom on transverse surfaces of the said skirt and said annular head respectively, a plurality of coolant passages extending through the body of the cable for conducting coolant over the two groups of conductors, and the passages all communicating at the opposite ends of the cable with the interiors of the hollow walled terminals respectively, and means to conduct coolant from a supply source into one hollow terminal and means to discharge the coolant from the other hollow terminal, the tubular casing being composed of flexible elastic material and having a cord incorporated in the material of the casing wall and disposed helically only about the casing axis to strengthen the casing wall radially without materially reducing its flexibility, the connection of the longitudinally inelastic conductors to the terminals preventing longitudinal stretching of the casing.

LYNN S. BURGETT.